United States Patent
Dubbin et al.

(10) Patent No.: US 10,042,830 B2
(45) Date of Patent: Aug. 7, 2018

(54) WRITING AND PRODUCTION METHODS, SOFTWARE, AND SYSTEMS

(71) Applicant: Scripto Enterprises LLC., New York, NY (US)

(72) Inventors: Robert J. Dubbin, New York, NY (US); Stephen Colbert, New York, NY (US); David Cole, Mountain View, CA (US); Jason Livesay, San Diego, CA (US); Mindy Tchieu, Brooklyn, NY (US); Sasha Stewart, New York, NY (US)

(73) Assignee: SCRIPTO ENTERPRISES LLC., New York, NY (US)

( * ) Notice: Subject to any disclaimer, the term of this patent is extended or adjusted under 35 U.S.C. 154(b) by 438 days.

(21) Appl. No.: 14/272,114

(22) Filed: May 7, 2014

(65) Prior Publication Data
US 2015/0324345 A1 Nov. 12, 2015

(51) Int. Cl.
*G06F 17/00* (2006.01)
*G06F 17/24* (2006.01)
(Continued)

(52) U.S. Cl.
CPC ............ *G06F 17/24* (2013.01); *G06F 17/212* (2013.01); *G06F 17/218* (2013.01); *G06F 17/246* (2013.01); *G06Q 10/101* (2013.01)

(58) Field of Classification Search
CPC .... G06Q 10/101; G06F 17/212; G06F 17/218
See application file for complete search history.

(56) References Cited

U.S. PATENT DOCUMENTS 5,339,388 A * 8/1994 Bates ................. G06F 3/04812
715/742
7,143,357 B1 * 11/2006 Snibbe ................. G06F 3/0483
715/751
(Continued)

OTHER PUBLICATIONS

Joshua Brustein—Bloomberg; "Colbert Report's TV Production Software Is No Joke"; Jun. 17, 2014; 3 pages; https://www.bloomberg.com/news/articles/2014-06-17/colbert-reports-tv-production-software-is-no-joke.*
(Continued)

*Primary Examiner* — Scott Baderman
*Assistant Examiner* — Benjamin J Smith
(74) *Attorney, Agent, or Firm* — Hunton Andrews Kurth LLP

(57) ABSTRACT

An embodiment of a method of editing a script includes displaying the script in a script editor on a computing device, receiving textual input to the displayed script from an input of the computing device, determining whether the textual input includes a predetermined production element marker, and displaying the textual input in the script editor using text properties based on the determination of whether the textual input includes the marker. An embodiment of a method of editing a script or rundown includes displaying the script or rundown in a script or rundown editor on a first computing device, receiving at the first computing device textual input or cursor movement transmitted from a second computing device in response to it being entered into the script or rundown at the second computing device, and displaying the textual input or cursor movement in the script or rundown on the first computing device.

18 Claims, 18 Drawing Sheets

(51) Int. Cl.
*G06F 17/21* (2006.01)
*G06Q 10/10* (2012.01)

(56) References Cited

U.S. PATENT DOCUMENTS

| | | | | | |
|---|---|---|---|---|---|
| 7,207,057 | B1* | 4/2007 | Rowe | | H04L 29/06027 725/144 |
| 7,603,626 | B2* | 10/2009 | Williams | | G06Q 10/10 715/201 |
| 7,660,416 | B1* | 2/2010 | Kline | | G06Q 10/10 380/216 |
| 8,615,517 | B1* | 12/2013 | Vice | | G06F 17/30017 707/621 |
| 8,867,905 | B2* | 10/2014 | Roberts, Jr. | | G11B 27/323 386/348 |
| 9,667,676 | B1* | 5/2017 | Lo | | H04L 65/4015 |
| 2001/0025296 | A1* | 9/2001 | Narang | | G06Q 10/10 709/201 |
| 2002/0026478 | A1* | 2/2002 | Rodgers | | G06F 8/65 709/205 |
| 2002/0073151 | A1* | 6/2002 | Rogers | | G06Q 10/10 709/204 |
| 2002/0129106 | A1* | 9/2002 | Gutfreund | | G06Q 10/10 709/205 |
| 2003/0060910 | A1* | 3/2003 | Williams | | G06Q 10/10 700/91 |
| 2003/0081581 | A1* | 5/2003 | Clark | | H04B 1/74 370/338 |
| 2007/0157164 | A1* | 7/2007 | Fannin | | G06F 17/21 717/110 |
| 2007/0162854 | A1* | 7/2007 | Kikinis | | A63F 13/10 715/719 |
| 2007/0271587 | A1* | 11/2007 | Rowe | | H04L 29/06027 725/109 |
| 2007/0282680 | A1* | 12/2007 | Davis | | G06Q 30/00 705/14.69 |
| 2008/0301228 | A1* | 12/2008 | Flavin | | G06Q 10/10 709/204 |
| 2009/0094039 | A1* | 4/2009 | MacDonald | | G06Q 10/00 705/300 |
| 2010/0199191 | A1* | 8/2010 | Takahashi | | G06F 3/0481 715/741 |
| 2011/0026898 | A1* | 2/2011 | Lussier | | G11B 27/034 386/280 |
| 2011/0249953 | A1* | 10/2011 | Suri | | G11B 27/034 386/239 |
| 2012/0311448 | A1* | 12/2012 | Achour | | G06Q 10/101 715/723 |
| 2012/0331168 | A1* | 12/2012 | Chen | | H04L 67/1097 709/231 |
| 2013/0110513 | A1* | 5/2013 | Jhunja | | G06F 17/30746 704/270.1 |
| 2013/0151970 | A1* | 6/2013 | Achour | | H04N 21/854 715/723 |
| 2013/0275312 | A1* | 10/2013 | Claman | | G06Q 10/103 705/301 |
| 2013/0318582 | A1* | 11/2013 | McCann | | G06F 21/41 726/7 |
| 2014/0233918 | A1* | 8/2014 | Roberts, Jr. | | G11B 27/323 386/285 |
| 2015/0100943 | A1* | 4/2015 | Gabel | | G06Q 30/02 717/106 |
| 2015/0331869 | A1* | 11/2015 | Berg | | G06F 17/30056 715/716 |

OTHER PUBLICATIONS

Rundown Creator; API, features, how it works web pages taken from Web Archive between Mar. and Dec. 2013; 64 pages; https://web.archive.org/web/20130721011343/http://rundowncreator.com/.*

Christopher Boone; "WriterDuet App Lets You Collaborate on Screenplays Online in Real Time for Free"; Sep. 14, 2013; 7 pages; http://nofilmschool.com/2013/09/writerduet-app-collaborate-on-screenplays-online-in-real-time-for-free.*

Etherpad-Lite v1.21 Manual & Documentation, pp. 1-25, last visited on Jul. 18, 2014, via <<http://etherpad.org/doc/v1.2.1/>>.

AP ENPS Version 7, p. 1, last visited on Jul. 21, 2014, via <<http://www.enps.com/assets/file/Releases/apenpsv7.pdf>>.

INews Datasheet, pp. 1-2, last visited on Jul. 21, 2014, via <<http://www.avid.com/US/products/family/iNEWS>>.

PDFKit, pp. 1-3, last visited on Jul. 15, 2014, via <<http://pdfkit.org/>>.

Elasticsearch, pp. 1-4, last visited on Jul. 15, 2014, via <<http://www.elasticsearch.org/overview/>>.

Etherpad, pp. 1-3, last visited on Jul. 15, 2014, via <<http://etherpad.org/>>.

* cited by examiner

FIG. 3A

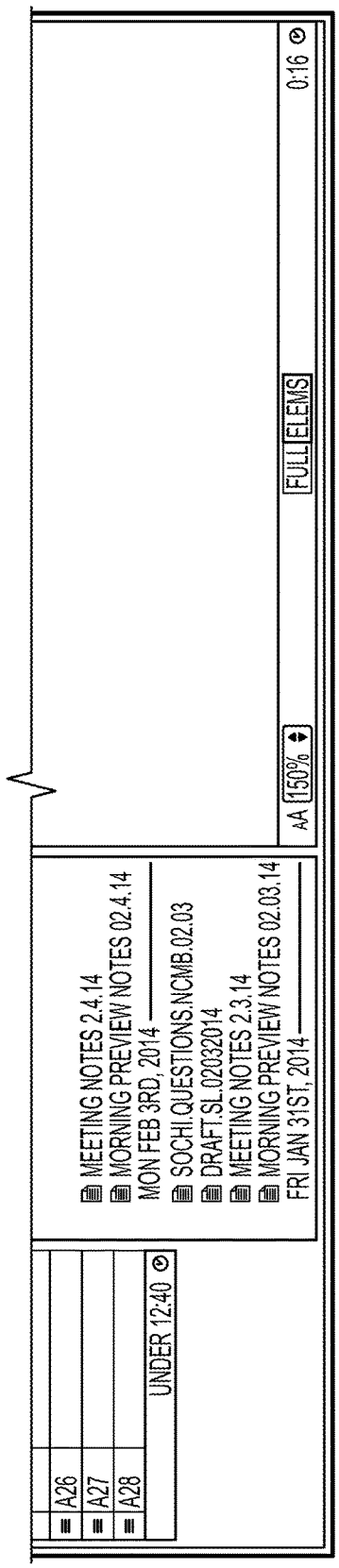
FIG. 3B (Contd.)

WRITING AND PRODUCTION METHODS, SOFTWARE, AND SYSTEMS

BACKGROUND INFORMATION

Production of a television show is a tightly choreographed process involving many interlocking components. One component is the generation of scripts and rundowns for the show. A script typically includes spoken dialog as well as some indication of production elements. A rundown typically includes a timeline of each element of the show.

Generating scripts and rundowns is itself an iterative process involving writers, producers, supervisors and actors working together to produce final versions of these documents. Although this process may vary, it typically involves rounds of meetings, assignments, review, editing, and rehearsal, each of which potentially generates changes to previous script and rundown documents as well as new documents. This process thus generates many documents that must be accessed and operated on by multiple individuals, often at the same time.

Unfortunately, previous systems provided to facilitate these tasks have suffered from several problems that have limited their usefulness. In an attempt to accommodate the entry of both dialog elements and production elements into a script, previous systems require a user to enter production elements through the interaction with control and data-entry elements of separate dialog or window interface components. However, such interaction undesirably diverts the user's energy from the creative writing process.

In an attempt to accommodate the collaborative nature of script and rundown generation, previous systems have adopted a locking model of data concurrency control, in which more than one user can view a given document at once, but where only one user may have editing privileges for the document at any specific time. However, this is in fact fundamentally out of tune with such collaboration, where multiple writers and producers may wish to work on the same document at the same time from different locations while having an awareness of the others' work and without any resulting data inconsistency.

Other problems also exist in previous systems, such as an inability to easily determine which scripts are included in a given rundown, an inability to effectively search existing scripts and rundowns, and an inability to efficiently process script documents.

Therefore, a need exists for writing and production systems to enable entry of both dialog and production elements into a script without undesirably diverting the user's energy from the writing process, enable multiple users to work on the same script or rundown documents at the same time while having a real-time awareness of the others' work, and address other problems.

BRIEF DESCRIPTION OF THE DRAWINGS

So that features of the present invention can be understood, a number of drawings are described below. However, the appended drawings illustrate only particular embodiments of the invention and are therefore not to be considered limiting of its scope, for the invention may encompass other equally effective embodiments.

FIGS. 3A-3B are screenshots depicting embodiments of user interface components of the writing and production system.

FIGS. 7A-7E are screenshots depicting embodiments of exemplary states of the user interface during the editing of a rundown.

DETAILED DESCRIPTION OF EXAMPLE EMBODIMENTS

An embodiment of a method of editing a script can include displaying the script in a script editor on a display of a computing device, receiving textual input to the displayed script in the script editor from an input of the computing device, determining whether the textual input includes a predetermined production element marker, and displaying the textual input in the script editor using text properties based on whether the textual input includes the marker.

The textual input can be displayed as a dialog element, using first text properties, if the textual input does not include any marker, or as an incomplete production element, using second text properties, if the textual input includes an production element opening marker. The textual input can be displayed as a completed production element, using third text properties, upon receiving a further textual input having a production element closing marker. The production element markers can include one or more selectable textual characters. The respective text properties can include at least one of a selected font, size or color.

An embodiment of a method of concurrently editing a script or rundown on multiple workstations can include displaying the script or rundown in a script or rundown editor on a display of a first computing device, receiving at the first computing device textual input or cursor movement transmitted from a second computing device in response to it being entered in the script or rundown in a script or rundown editor at the second computing device, and displaying the textual input or cursor movement in the script or rundown in the script or rundown editor on the first computing device.

Optionally, each character of the textual input or each movement of the cursor can be transmitted to the first computing device in response to it being entered at the second computing device. The textual input or cursor movement can also be transmitted from the second computing device to the first computing device through a server computing device. For a script, in one embodiment the textual input but not the cursor movement can be transmitted to and displayed on the first computing device, and for a rundown, in one embodiment both the textual input and the cursor movement can be transmitted to and displayed on the first computing device.

Non-transitory machine-readable media can include program instructions that when executed perform embodiments of these methods. A system can include one or more computing devices, such as one or more workstations and/or servers, having a memory and a processor, the memory including program instructions that when executed by the processor perform embodiments of these methods.

Figure 1:
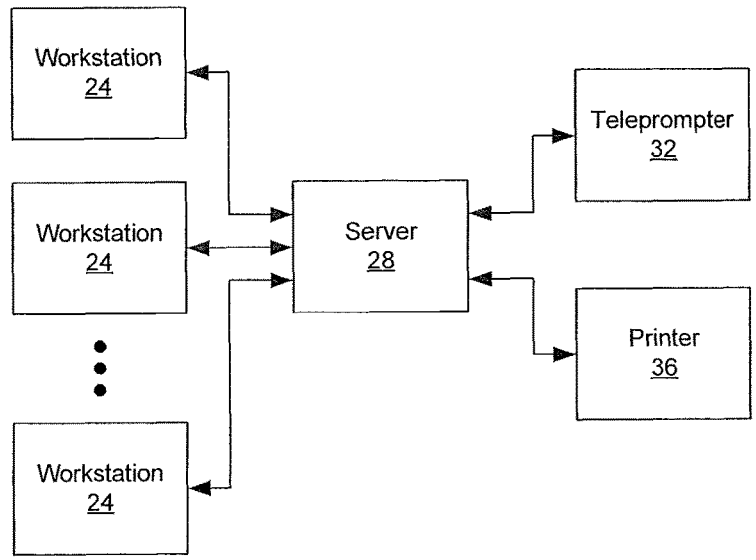
FIG. 1 is a schematic diagram depicting an embodiment of a writing and production system.

FIG. 1 depicts an embodiment of a writing and production system 20 for use in generating scripts and rundowns. The depicted writing and production system 20 can include a plurality of workstations 24, a server 28, a teleprompter 32 and a printer 36.

The workstations 24 can provide a platform for accessing functionality of the system 20 by writers, producers and other members of a production team, and can each be a computing device such as a computer, a laptop, a tablet, or a smartphone, etc. The server 28 can provides a central computing and storage node to enable, in combination with the workstations 24, functionality of the system 20, and can be a computing device such as a specialized computer, a general purpose computer, a laptop, or a tablet, etc. The workstations 24 and server 28 can each include a processor, a display, memory such as non-transitory storage media, an input device, and a transceiver.

The teleprompter 32 can receive data from the sever 28 and display dialog to an actor or other on-screen persona during taping or live broadcast of a television show based on the received data.

Figure 2:
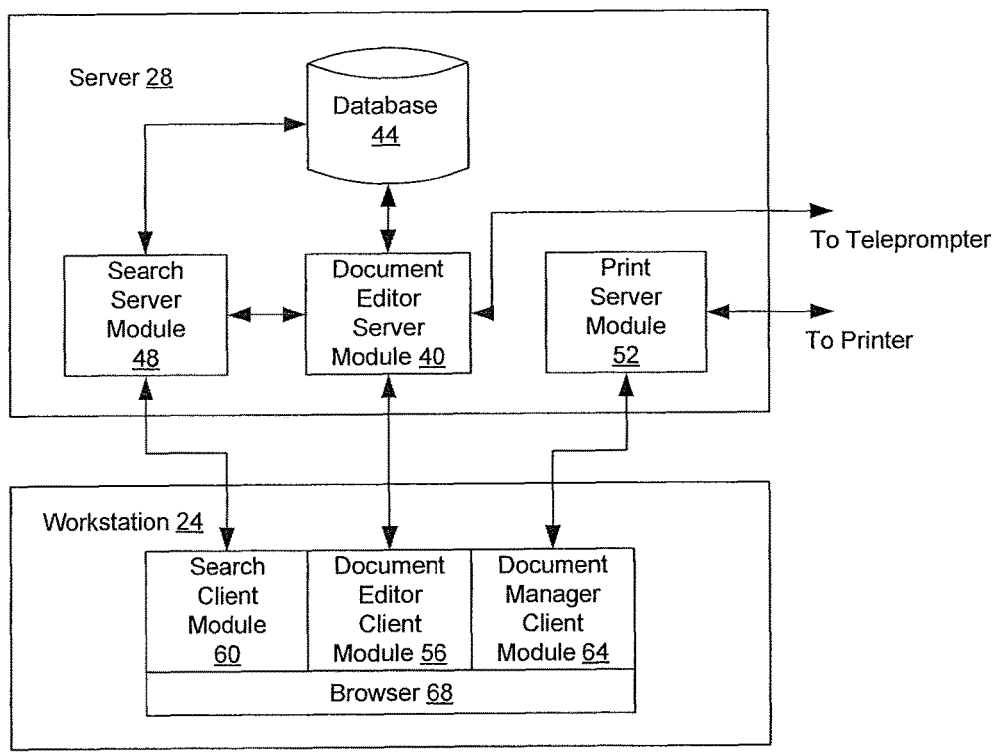
FIG. 2 is a schematic diagram depicting an embodiment of software modules of the writing and production system.

FIG. 2 depicts an embodiment of software modules of the writing and production system 20. The server 28 and workstations 24 can each store as program instructions in non-transitory storage media and execute with a processor their respective modules to perform corresponding functionality. The server software modules can include a document editor server module 40, a database 44, a search server module 48, and a print server module 52. The workstation software modules can include a document editor client module 56, a search client module 60, a document manager client module 64, and a browser 68. Note that, for illustration purposes, FIG. 2 omits elements of the server 28 and workstations 24 other than the depicted software modules.

The document editor server and client modules 40, 56 can operate, in conjunction with the database 44, to provide script and rundown document editing, file processing and corresponding communication functionalities discussed herein. The search server and client modules 48, 60 can operate, in conjunction with the document editor modules 40, 56 and the database 44, to provide document search functionalities discussed herein. The document manager client module 64 and print server module 52 can operate to provide document management and print functionalities described herein. The browser 68 can operate, in conjunction with the other client modules, to provide user interface components of the writing and production workstation 20.

Figure 3A:
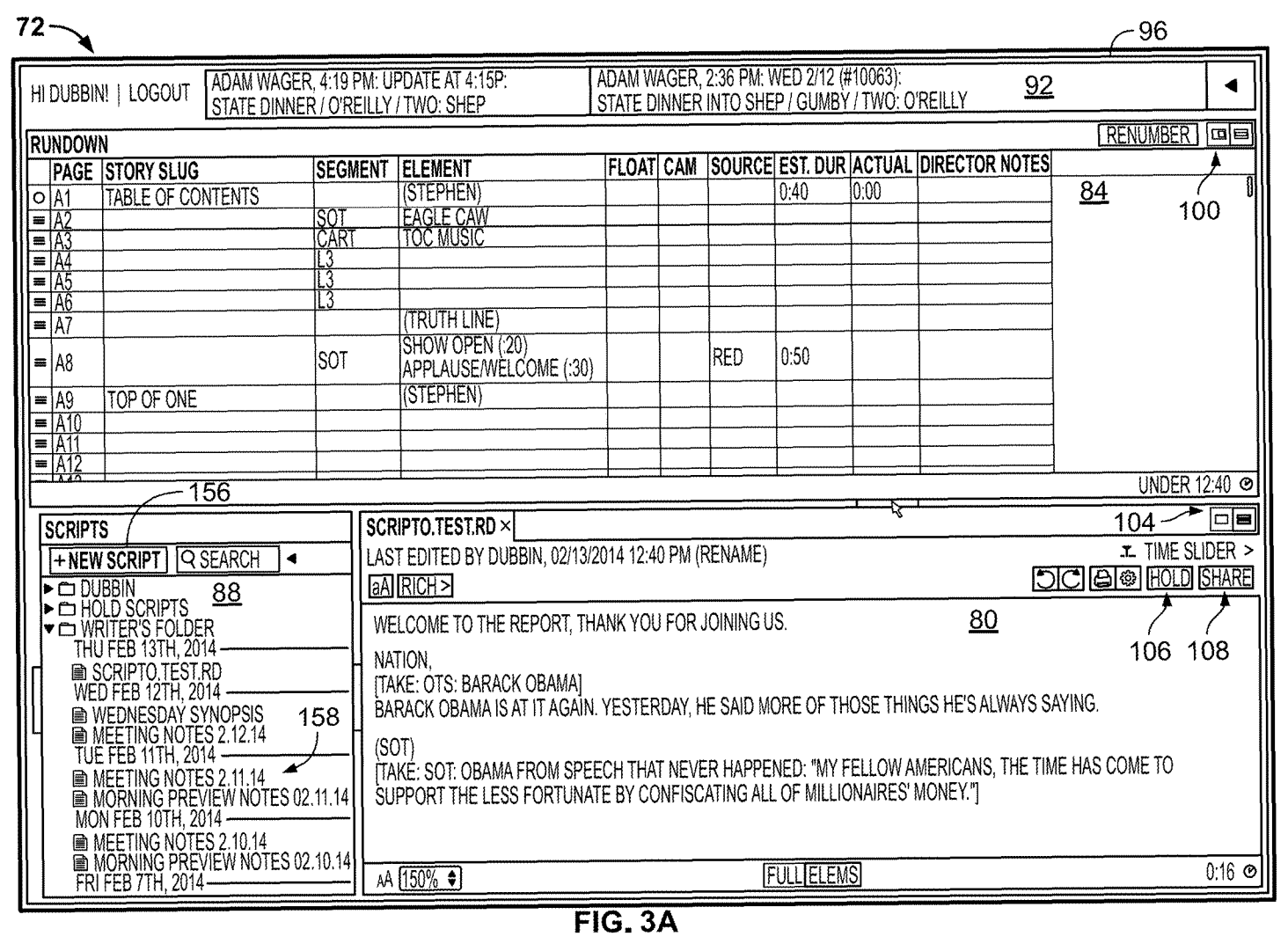

The writing and production system 20 can provide an integrated user interface to functionality of the system at each workstation 24. The user interface can include a plurality of components, such as a plurality of tiles, tabs, windows or other separate graphical areas presented within one or more browser windows or tabs, each of the components providing a selected functionality of the system 20 in a fashion integrated with the other components. FIG. 3A depicts one embodiment of the user interface 72 that includes a plurality of tile components presented within a browser window 96, the components including a script editor 80, a rundown editor 84, a document manager 88, and a notification bar 92.

Figure 3B:
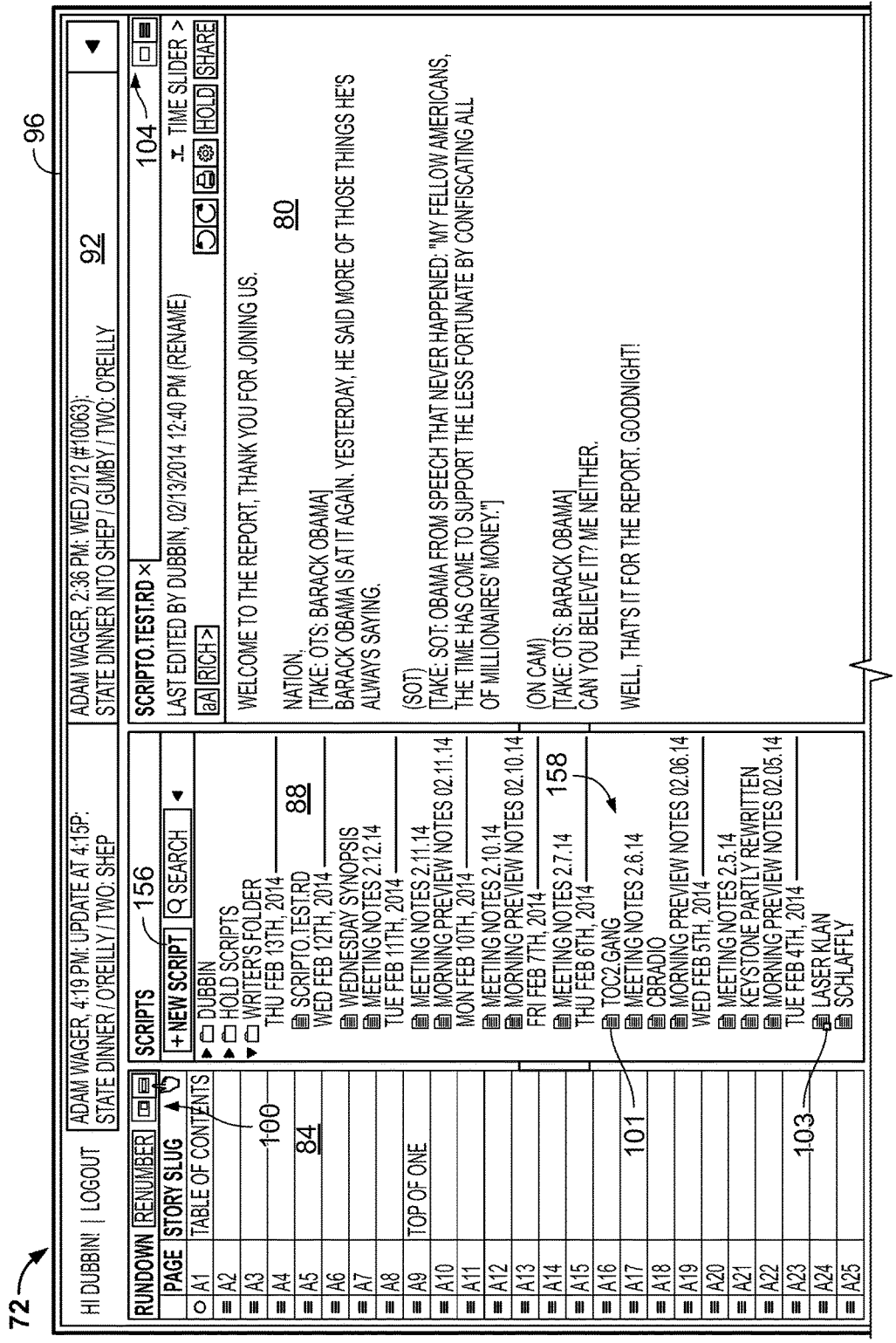

The arrangement of the user interface components within the browser window and with respect to each other can be configured by the user upon activation of configuration controls 100, 104. For example, in FIG. 3A, the notification bar 92 and rundown editor 84 are arranged horizontally at the top of the window 96, and the document manager 88 and the script editor 80 are arranged vertically at the bottom of the window 96. FIG. 3B depicts another embodiment of the user interface 72 in which the arrangement of the tiles has been changed so that the rundown editor 84, document manager 88 and script editor 80 are all arranged vertically at the bottom of the window 96. Other configurations of the components of the user interface 76 are also possible.

The user interface components can also be selectively added to and removed from the user interface upon activation of corresponding controls, so that the user interface can present one, some or all of the tiles at any given time. For example, although FIGS. 3A and 3B depict embodiments of the user interface 72 including each of the notification bar 92, rundown editor 84, document manager 88, and script editor 80, FIGS. 5A-5F (discussed further below) depict embodiments of the user interface 72 configured to instead present only the notification bar 92, document manager 88, and script editor 80.

The script editor 80, in conjunction with other components of the writing and production system 20, can provide the user with the ability to edit scripts in an improved manner. The script editor 80 can facilitate the entry of both dialog and production elements while still distinguishing between these elements for purposes of both displaying and processing scripts. The script editor 80 can classify textual input as dialog until it receives a production element opening marker indicating that entry of a production element has begun. Upon receiving an opening marker, the script editor 80 can classify the textual input from that point as an incomplete production element until it receives a production element closing marker indicating that entry of the production element is has been completed. Upon receiving a closing marker, the script editor 80 can classify the textual input as a complete production element.

Figure 4:
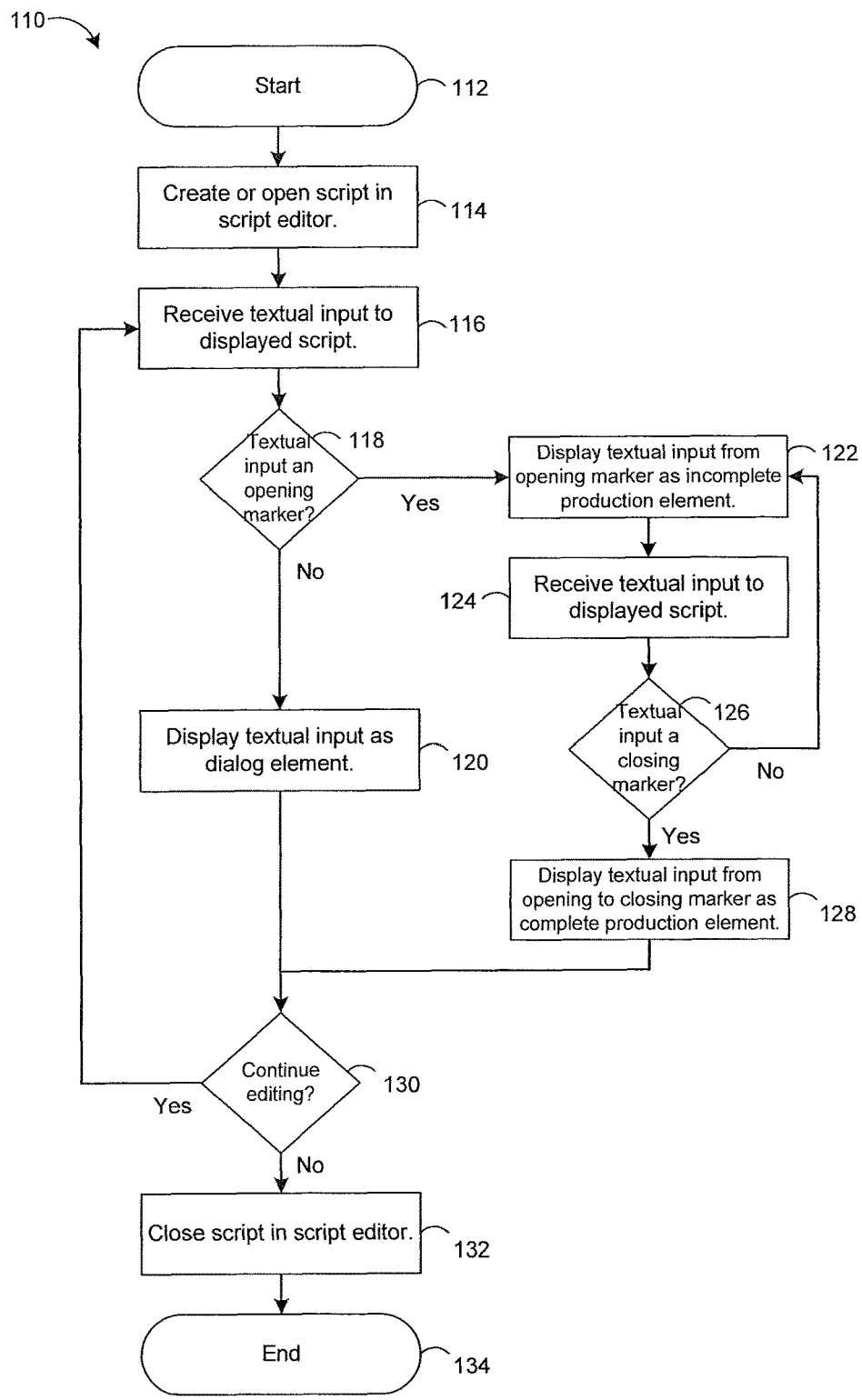
FIG. 4 is a flowchart depicting an embodiment of a method of editing a script using the writing and production system.

FIG. 4 depicts a flow chart illustrating one embodiment of a method 110 of editing a script using the script editor 80. The steps of the method 110 of FIG. 4 can be performed by one or more components of the writing and production system 20, such by one or more of the document editor client module 56, document editor server module 40, or database 44. FIGS. 5A-5F depict exemplary states of the user interface during the editing of a script.

Figure 5A:
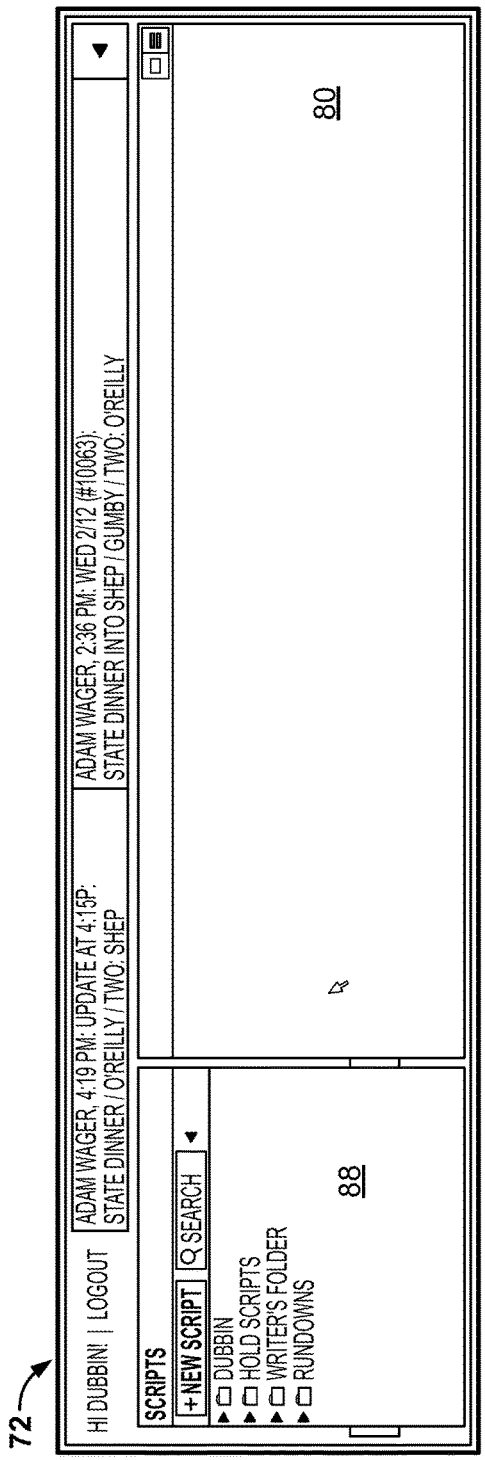
FIGS. 5A-5F are screenshots depicting embodiments of exemplary states of the user interface during the editing of a script.

The method 110 can begin at step 112. At step 114, a new script can be created or an existing script can be opened in the script editor 80. A new script can be created in response to a user activating a new script control 156 in the document manager 84, and an existing script can be opened in response to the user browsing a file structure listing 158 displayed in the document manager 88 and choosing an existing script. FIG. 5A depicts an exemplary state of the user interface upon creating and launching a new script in the script editor 80.

At step 116, textual input can be received into the script at the script editor 80. The textual input can be received in response to the user entering text using the input device (such as a keyboard) of the workstation. Entering textual input into the script editor 80 can be considered to be similar to entering text into a text editor or word processor.

Figure 5B:
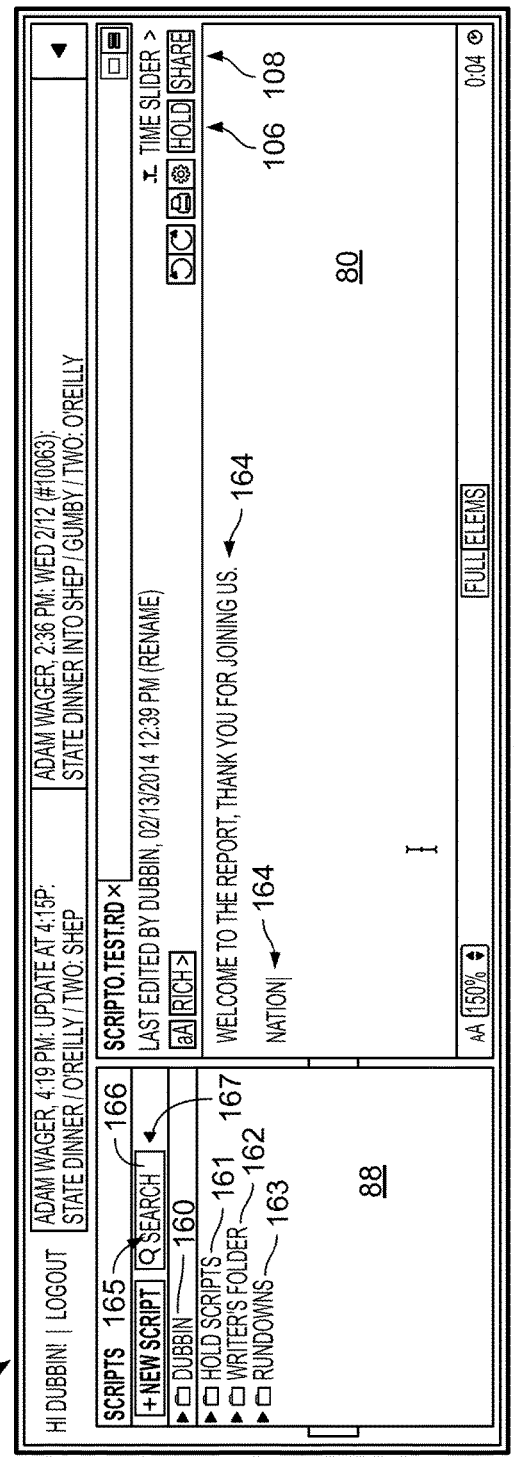

At step 118, the script editor 80 can determine whether the received textual input includes an opening marker of a production element. If at step 118 an opening marker is not detected, at step 120 the script editor can display the received textual input as a dialog element 164 by displaying the received textual input as text having a first set of selectable text properties. The first set of selectable text properties can include one or more of a first font, a first size, or a first color. FIG. 5B depicts an exemplary state of the user interface 72 after receiving of textual input to the script editor 80 that has included only dialog elements 164. As depicted, the received dialog elements 164 can be displayed using first text properties including a first color such as black.

The opening marker of a production element can be a selectable textual character or set of textual characters. For example, the opening marker can be selected to be a textual character such as "[", a set of textual characters such as "[TAKE:", or any other textual character or set of textual characters.

Figure 5C:
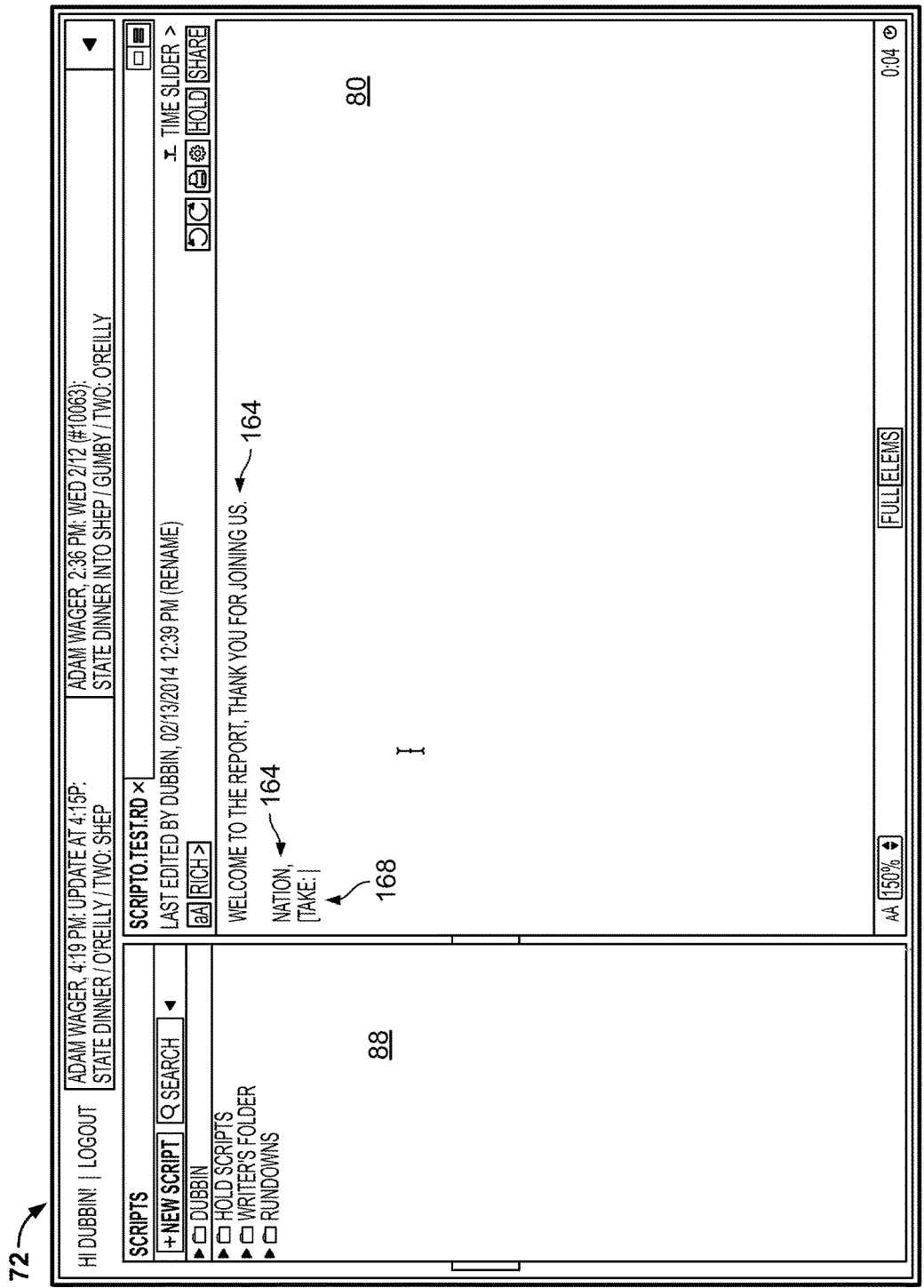

If at step 118 an opening marker 168 of a production element is detected, at step 122 the script editor 80 can display the received textual input as an incomplete production element 172 by displaying the received textual input from the opening marker as text having a second set of selectable text properties. The second set of selectable text properties can include one or more of a second font, a second size, or second color. FIG. 5C depicts an exemplary state of user interface 72 immediately after receiving an opening marker 168 in the script editor 80. As depicted, the received opening marker 168 can be displayed using second text properties including a second color such as blue.

Figure 5D:
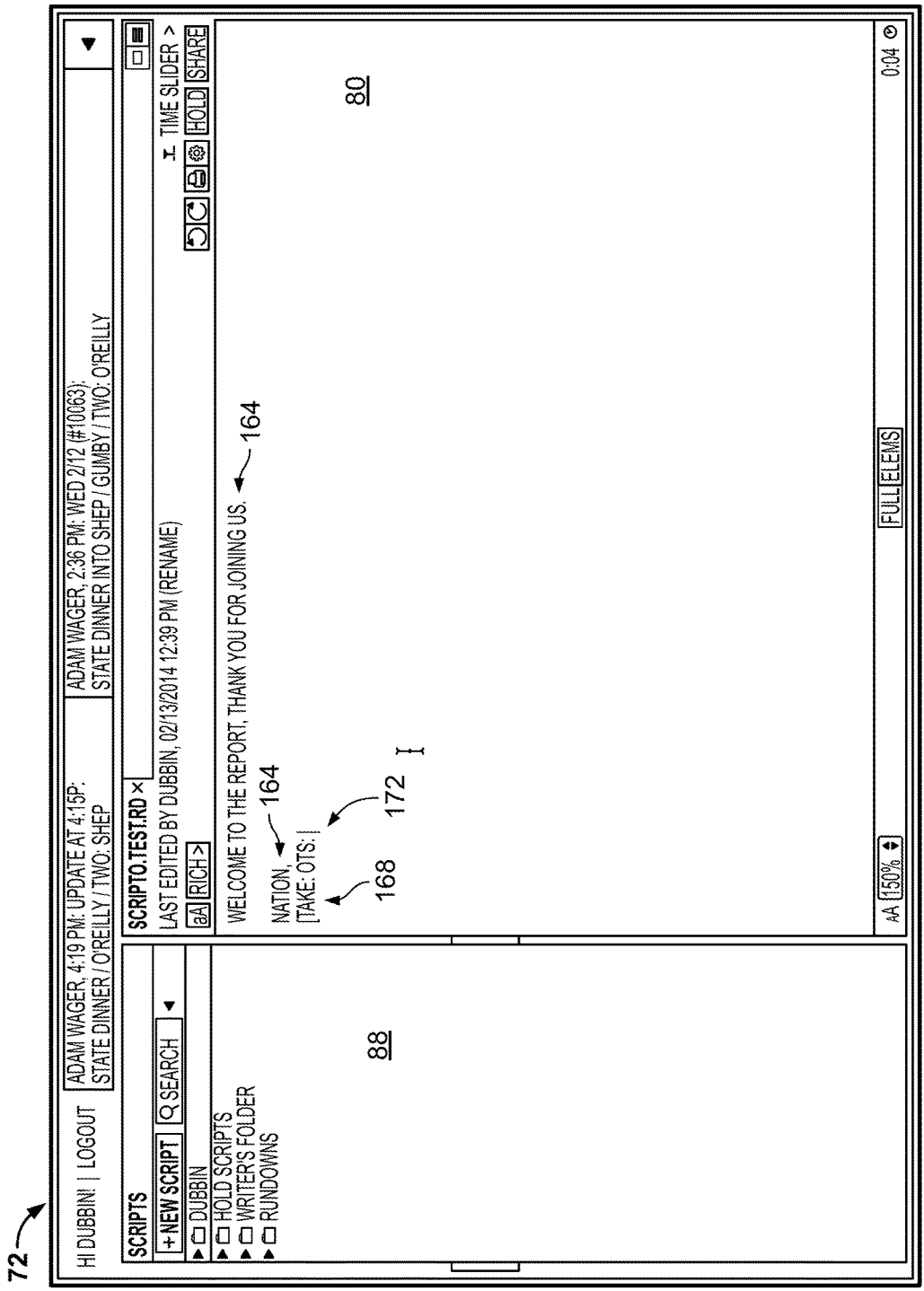

At step 124, further textual input can be received into the script at the script editor 80. At step 126, the script editor can determine whether the further textual input includes a closing marker of the incomplete production element 172. If at step 126 a closing marker is not detected, the method can return to step 122, where the script editor can continue to display the textual input received since the opening maker 168 as an incomplete production element 172. FIG. 5D depicts an exemplary state of the user interface 72 after receiving further textual input into the script editor 80 after receiving the opening marker 168, but without yet receiving a closing marker. As depicted, the opening marker 168 and further textual input can be displayed using the second text properties.

The closing marker of a production element can also be a selectable textual character or set of textual characters. For example, the closing marker can be set to be a textual character such as "]" or any other textual character or set of textual characters.

Figure 5E:
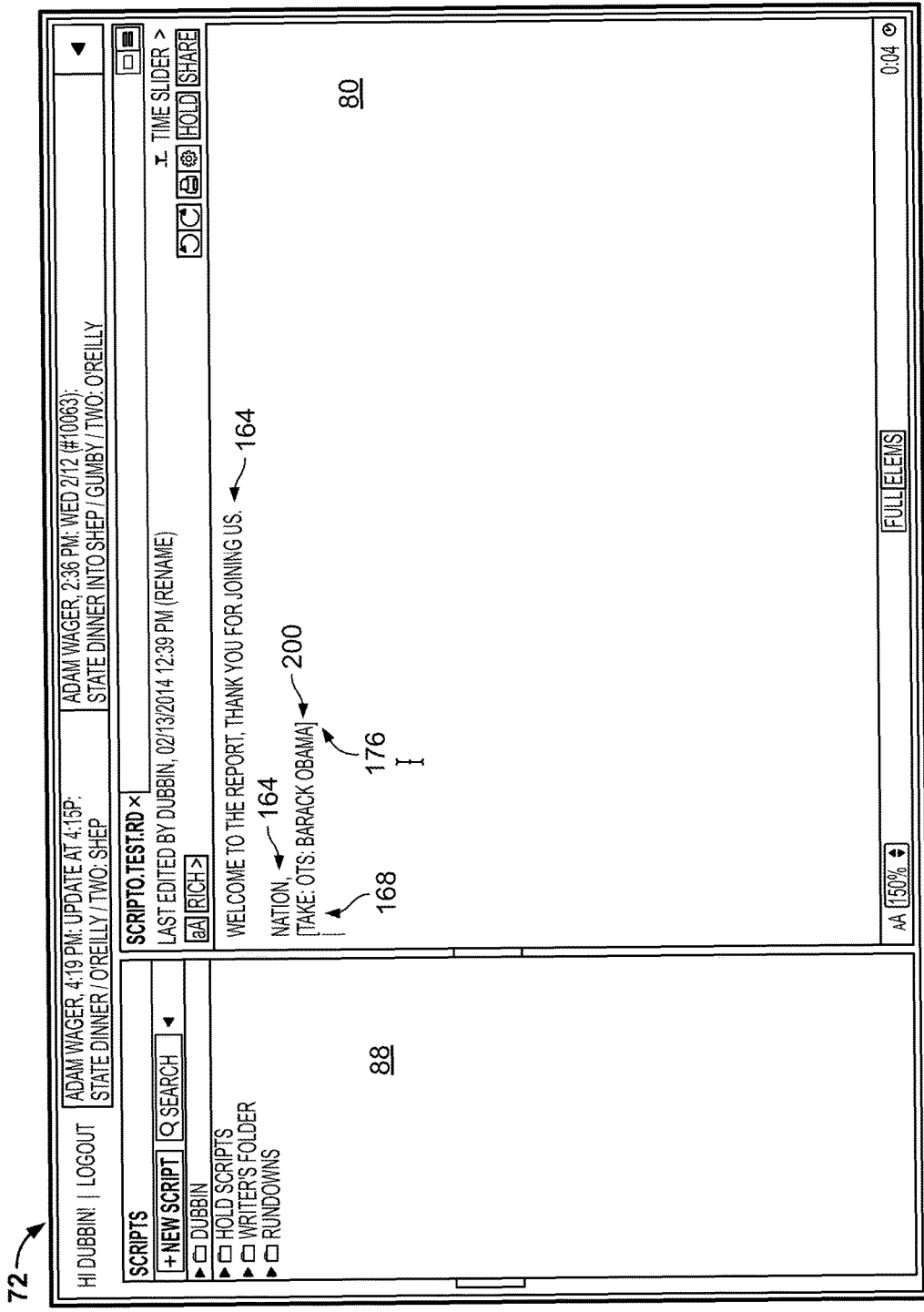

If at step 126 a closing marker 176 of the production element is detected, at step 128 the script editor 80 can display the received textual input, from the opening marker 168 to the closing maker 176, as a complete production element 200 by displaying this textual input as text having a third set of selectable properties. The third set of selectable text properties can include one or more of a third font, a third size or a third color. FIG. 5E depicts an exemplary state of the user interface 72 immediately after receiving entry of a closing marker 176. As depicted, the received textual input from the opening marker 168 to the closing marker 176 can be displayed using third text properties including a third text color such as red.

Figure 5F:
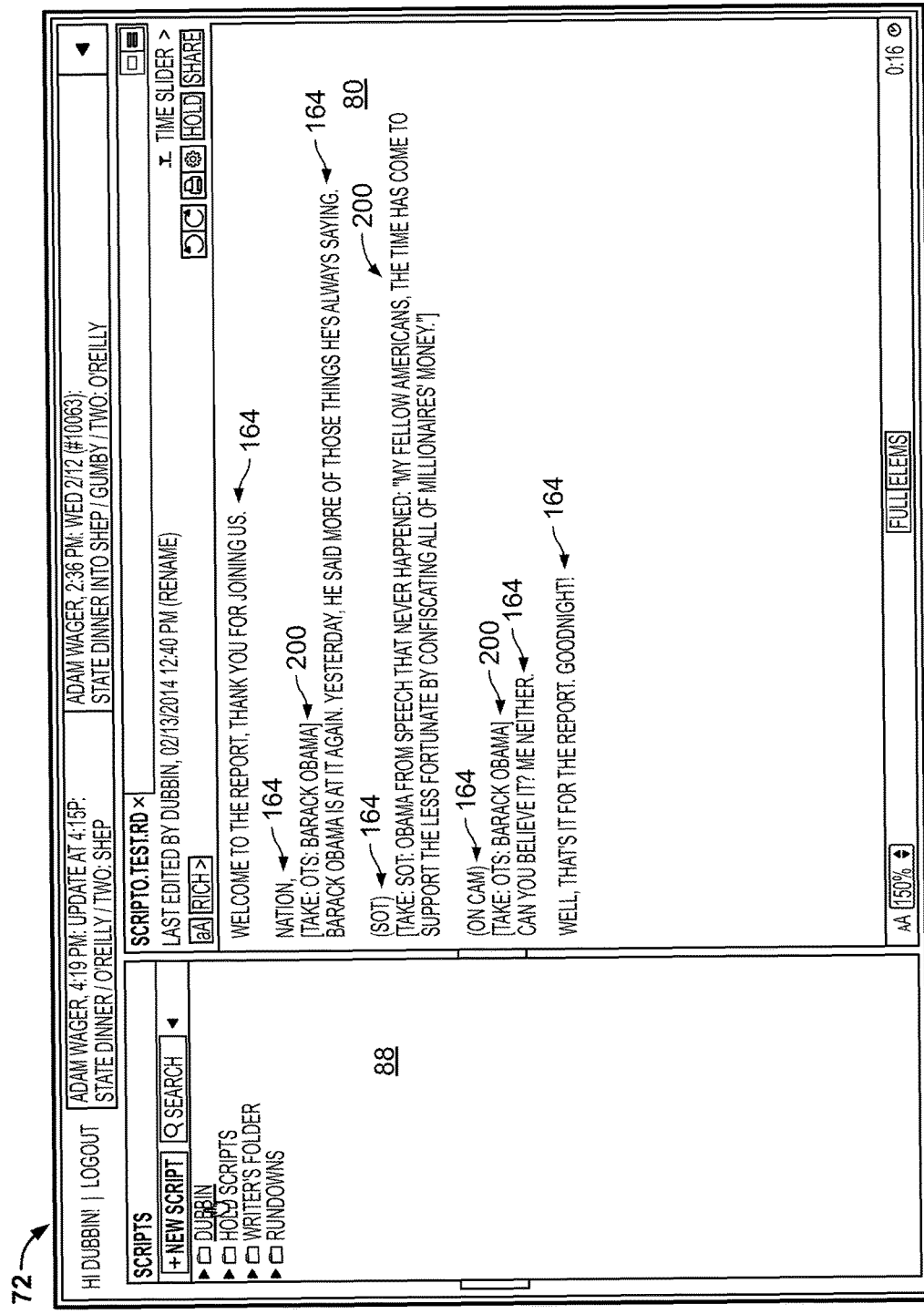

At step 130, it can be determined whether to continue editing the script, such as in response to the user making this decision. If at step 142, it is determined editing is to continue, the method can return to step 116. FIG. 5F depicts an exemplary state of the user interface 72 after entry of further dialog elements 164 and completed production elements 200.

If at step 130 it is determined that editing will not continue, at step 132 the script can be closed in the script editor 80, such as in response to the user activating a close script control. The script editor 80 can automatically save any edits to the script by the user at that workstation or by any other user at any other workstation in real time during the script editing process. The method 110 can end at step 134.

Embodiments of the writing and production system 20 can thus enable an improved entry and classification of dialog and production elements in comparison to previous systems. The writing and production system 20 can provide ease of entry of both dialog and production elements, with no need for the user to engage dialog windows or other interface elements separate from the script editing area. At the same time, the writing and production system 20 can still distinguish between dialog and production elements for purposes of both displaying and processing of these elements.

The display of dialog elements 164, incomplete production elements 172, and complete production elements 200 using different text properties can also enable a system of easy error checking by the user. For example, by displaying an incomplete production element 172 using different text properties than preceding dialog elements 164, the user receives visual feedback that the entry of a production element has begun. If entry of a production element was not intended, the user can immediately rectify this error. Similarly, by displaying the complete production element 200 using different text properties than the incomplete production element 172, the user receives visual feedback that the entry of the production element has been completed. If the user intended the production element to have been completed, but the textual input remains displayed as an incomplete production element 172, the user is again altered to the situation and can immediately rectify the error.

The script editor 80 can also receive entry of production elements into the script in a format to elicit various functionalities of the script editor 80 and other components of the writing and production system 20. In one embodiment, the production element format can include an ordered list of components between the opening and closing markers 168, 176, including one or more of a descriptor or a time element The descriptor can include any text that the user wishes to enter to describe the production element. The descriptor can include one or more of a plain-language textual description of the production element (such as "video of speech delivered yesterday"), acronyms to indicate various different production elements (such as OTS to indicate over the shoulder video, SOT to indicate sound on tape, VO to indicate voice over or B-roll video, FF to indicate full frame video, CART to indicate sound effect, PROP to indicate a prop, MONITOR to indicate contents of an auxiliary screen), or a hyperlink pointing to content or data related to the production element (such as an image file, a video file, sound file, a webpage, a word document, or a spreadsheet, etc.). In the caser of a hyperlink, the user can access the linked content or data by activating (e.g., clicking on) the hyperlink in the script editor, and the writing and production system 20 can display the accessed content in a window or tab of the browser, such as either a same or different browser window or tab containing the user interface 72.

The time element enables the user to associate a time quantity with a production element, which the script editor 80 can then use to estimate and display a total time to perform the script. The time element can include a time element indicator and a time amount. The time element indicator can be a selectable textual character or set of characters, and the time amount can be a numerical amount specified in a selectable base, such as minutes and seconds. For example, the time element can take the form of "T=0.30", with the time element indicator selected to be the textual character "T=", and the time amount indicating 30 seconds as "0.30".

The production element can also include any combination of the above components. An exemplary production element including all of the above components can be as follows: [Take: SOT: video published yesterday: http://localstorage/video1.mpg T=0.30].

Figure 6:
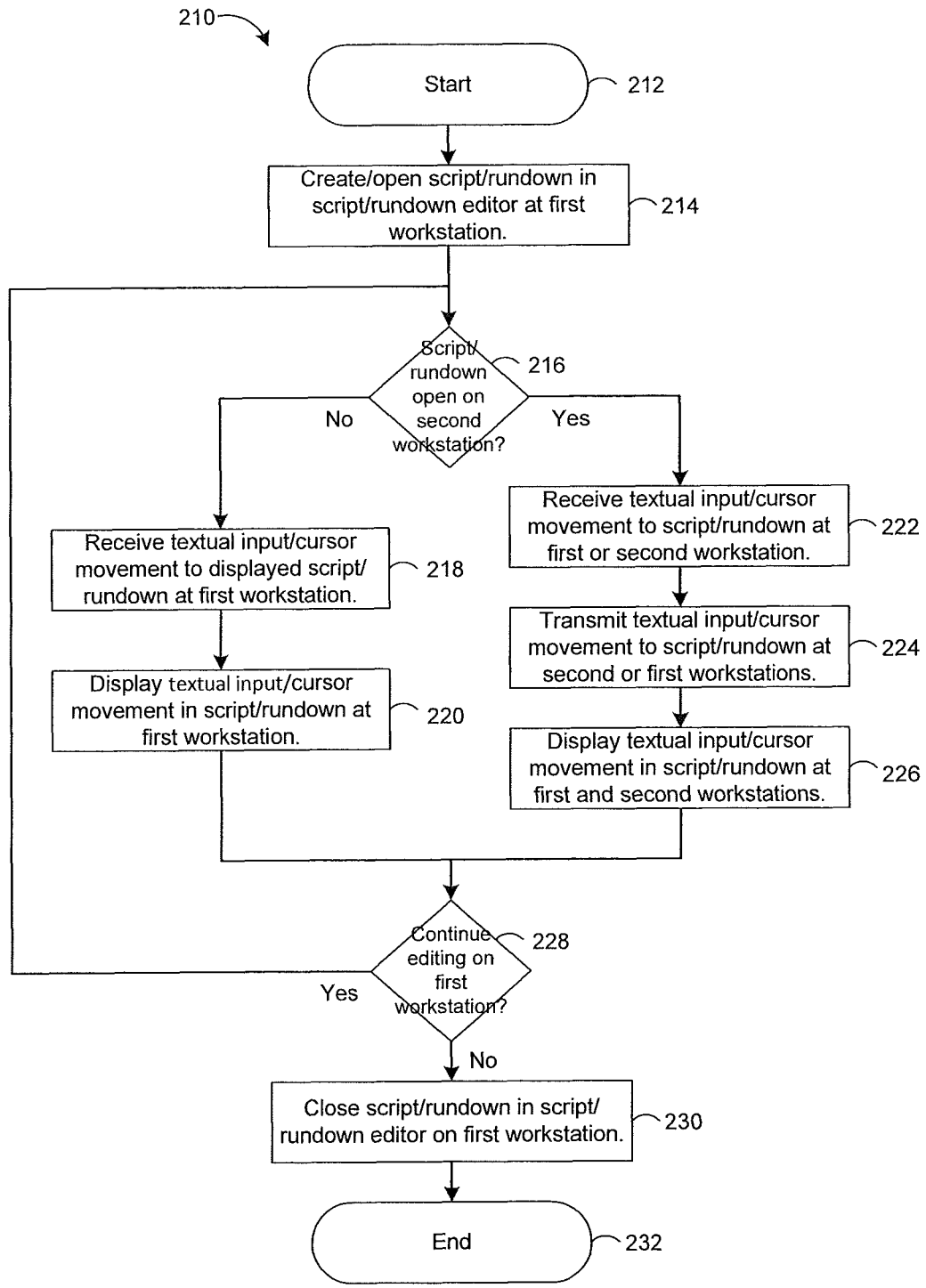
FIG. 6 is a flowchart depicting an embodiment of a method of editing a script or rundown using the writing and production system.

The script and rundown editors 80, 84 can also provide the user with the ability to edit scripts and rundowns in real-time concurrence with other users on other workstations 24. FIG. 6 is a flow chart depicting an embodiment of a method 210 of editing a script or rundown using the script or rundown editor 80, 84 in real-time concurrence with other users on other workstations 24. The steps of the method 210 of FIG. 6 can be performed by one or more components of the writing and production system 20, such by one or more of the document editor client module 56, document editor server module 40, or database 44. FIGS. 7A-7E depict exemplary states of the user interface 72 illustrating aspects of editing a rundown using the rundown editor 84.

The software modules of the writing and production system 20 can enable the concurrent editing of a given script or rundown in the script or rundown editors 80, 84 on multiple workstations 24 through the use of real-time messaging between the document editor client module 56, document editor server module 40 and database 44. As a result, the script and rundown editors 80, 84 can display in essentially real time any changes made to a given script or rundown open on any workstation 24 in the same script or rundown open on any other of the workstations 24. The character of the real time display of changes can be controlled by controlling the responsiveness with respect to time and input of the messaging between the document editor client module 56, document editor server module 40, and database 44.

For example, the real time display of textual input to the script or rundown in one workstation 24 at another work station 24 can be controlled to occur on a per textual character basis. That is, as each character of the textual input is received into a given script or rundown at one work station 24, a representation of the input textual character can be transmitted within a predetermined time from that workstation 24 to the server 28 and then to any other workstation 24 on which the script or rundown is open, with the textual character then being displayed in the script or rundown on those other workstations 24 with only a small time lag from its original entry.

The real time display of cursor movement received in a rundown on one workstation 24 at another workstation 24 can also be controlled to occur on a per cursor movement basis. That is, as each cursor movement is entered into a given rundown at one workstation 24, a representation of the cursor movement can be transmitted within a predetermined time from that workstation to the server 28 and then to any other workstation 24 on which the rundown is open, with the cursor movement and optionally any corresponding cell highlighting then being displayed in the script or rundown on those other workstations 24 with only a small time lag from its original entry.

The method 210 can begin at step 212. At step 214, a new script or rundown can be created or an existing script or rundown can be opened at a first workstation 24 using the script editor or rundown editor 80, 84. For scripts, step 214 can be performed in the same manner as in step 114 of the method 110 of FIG. 4.

Figure 7A:
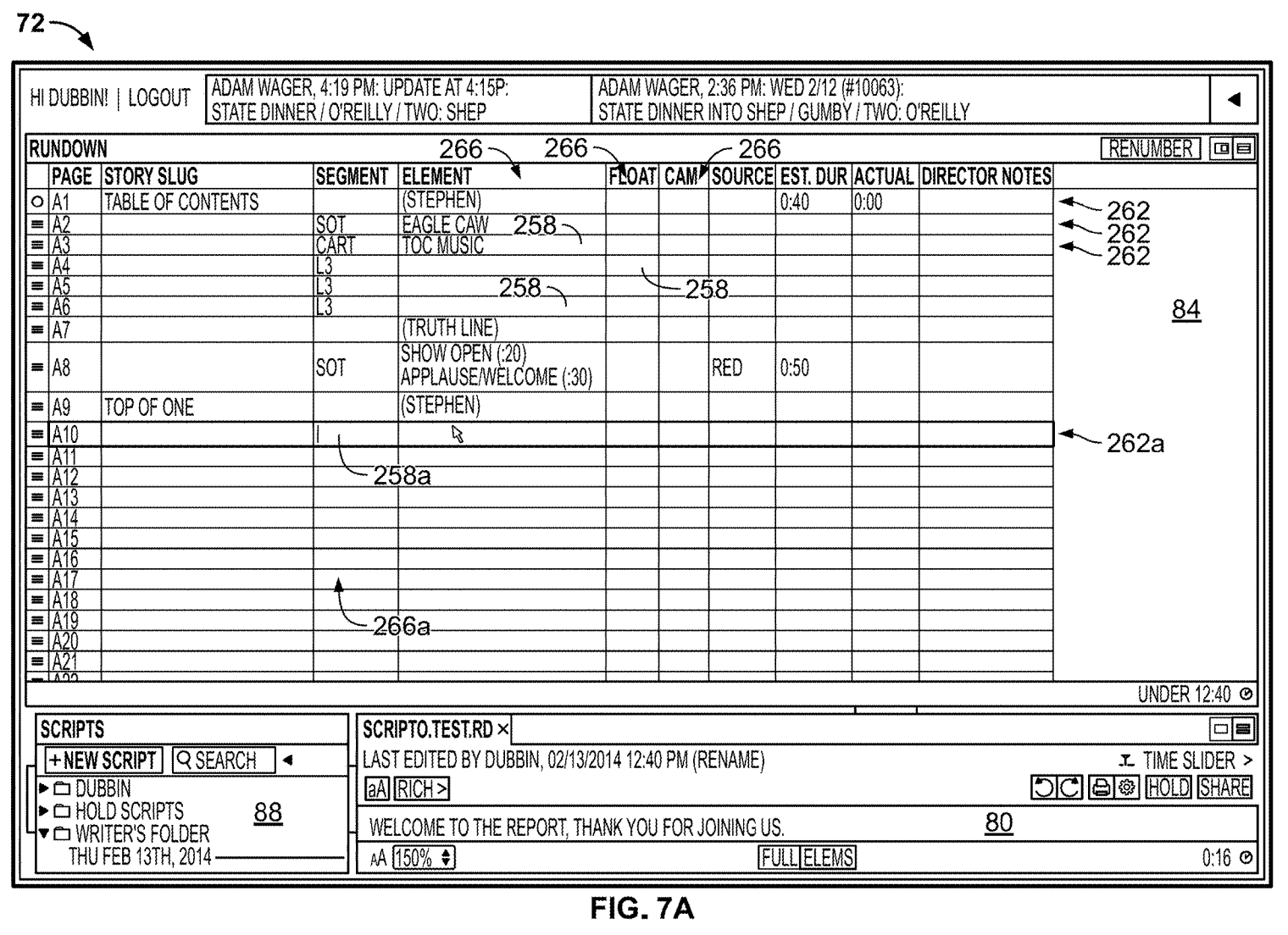

With respect to rundowns, FIG. 7A depicts an exemplary state of the user interface 72 upon opening a rundown in the rundown editor 84. The process of editing rundowns can by analogy be considered to operate in some aspects akin to editing a spreadsheet in a spreadsheet program. Leaving analogies behind, a rundown can include an ordered list of show elements, each potentially having values for any of a set of specified show element properties. The show elements can include any elements utilized in television shows, such as scripts, production elements, commercial breaks, etc. The show element properties can include properties typically associated with show elements, such as story slugs, segments, element indicators, floats, cameras, sources, estimated duration, actual duration, director notes, etc. The ordered list can thus be organized into a two-dimensional array of cells 258, with a plurality of rows 262, each row 262 corresponding to a show element, and a plurality of columns 266 segmenting the rows 262, each column 266 corresponding to a respective one of the show element properties. The rundown editor 84 can provide the user with the ability to navigate to any cell 258 using the input device of the workstation 24 (e.g., a keyboard or mouse), and edit the content of a particular 258 cell upon arrival. The rundown editor 84 can also highlight one or both of the currently selected cell 258 or row 262 along the way.

At step 216, the writing and production system 20 can determine if the created or opened script or rundown is currently open on another workstation 24. This determination can be accomplished through messaging between the document editor client module 56, document editor server module 40 and database 44, with at least one of these components, such as the document editor server module 40, keeping a real time record of any instance of the particular script or rundown open on any workstation 24.

If at step 216, it is determined that the script or rundown is not currently open on another workstation, the method 210 can proceed along a first branch. At step 218, textual input or cursor movement can be received into the script or rundown at the script or rundown editor 80, 84 on the first workstation 24. For scripts, step 218 can be performed in the same manner to as in step 116 in the method 110 of FIG. 4. With respect to rundowns, as discussed above, the user can both provide cursor movement input to navigate to cells 258 and provide textual input to edit cells 258.

At step 220, the script or rundown editor 80, 84 can display the received textual input or cursor movement in the script or rundown on only the first workstation 24. For scripts, the textual input can be displayed as either a dialog element 164 or production element, as the case may be, and therefore step 220 can include the performance of steps 116-130 as depicted in the method 110 of FIG. 4 to properly display the textual input in the script.

Figure 7B:
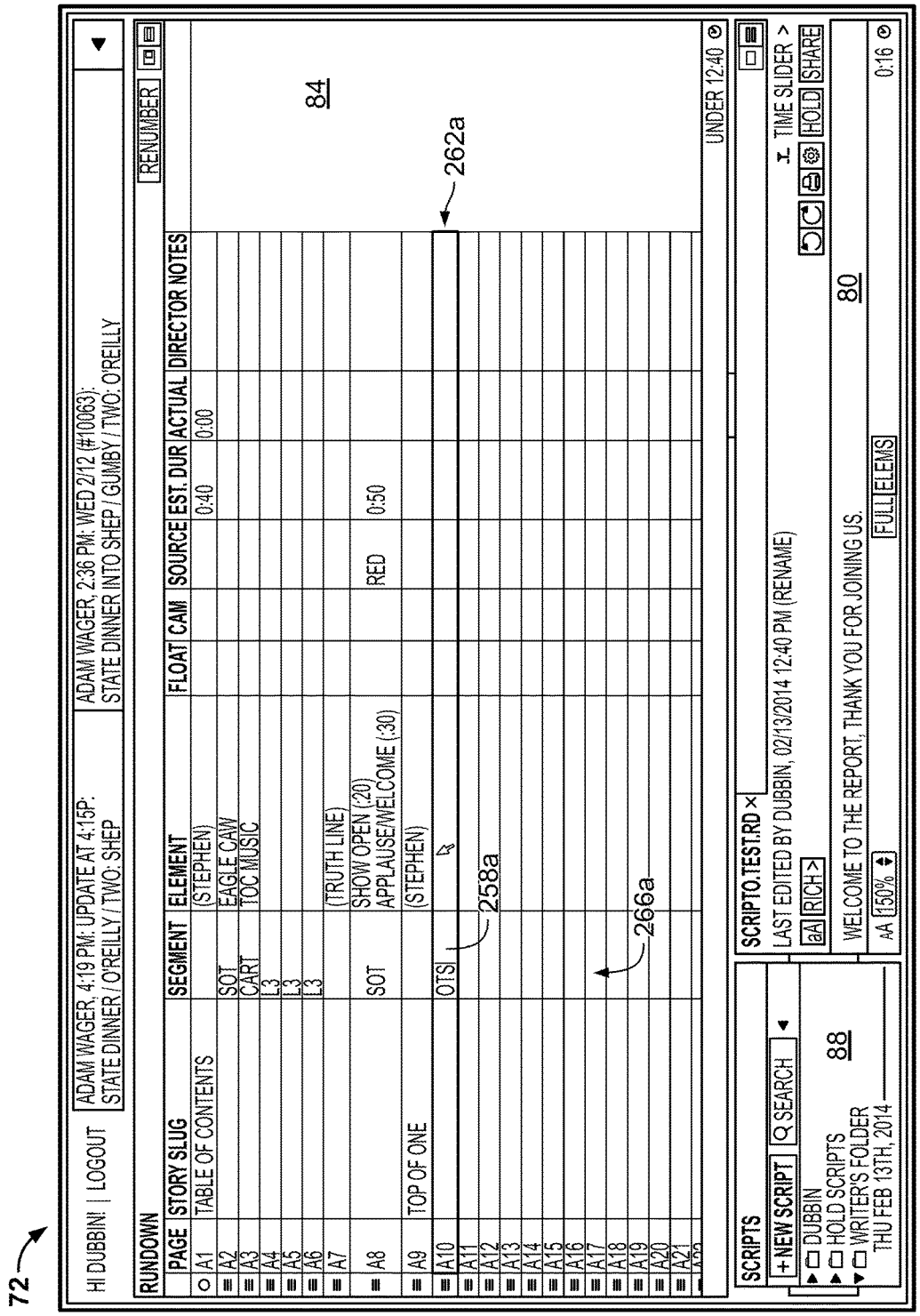
Figure 7C:
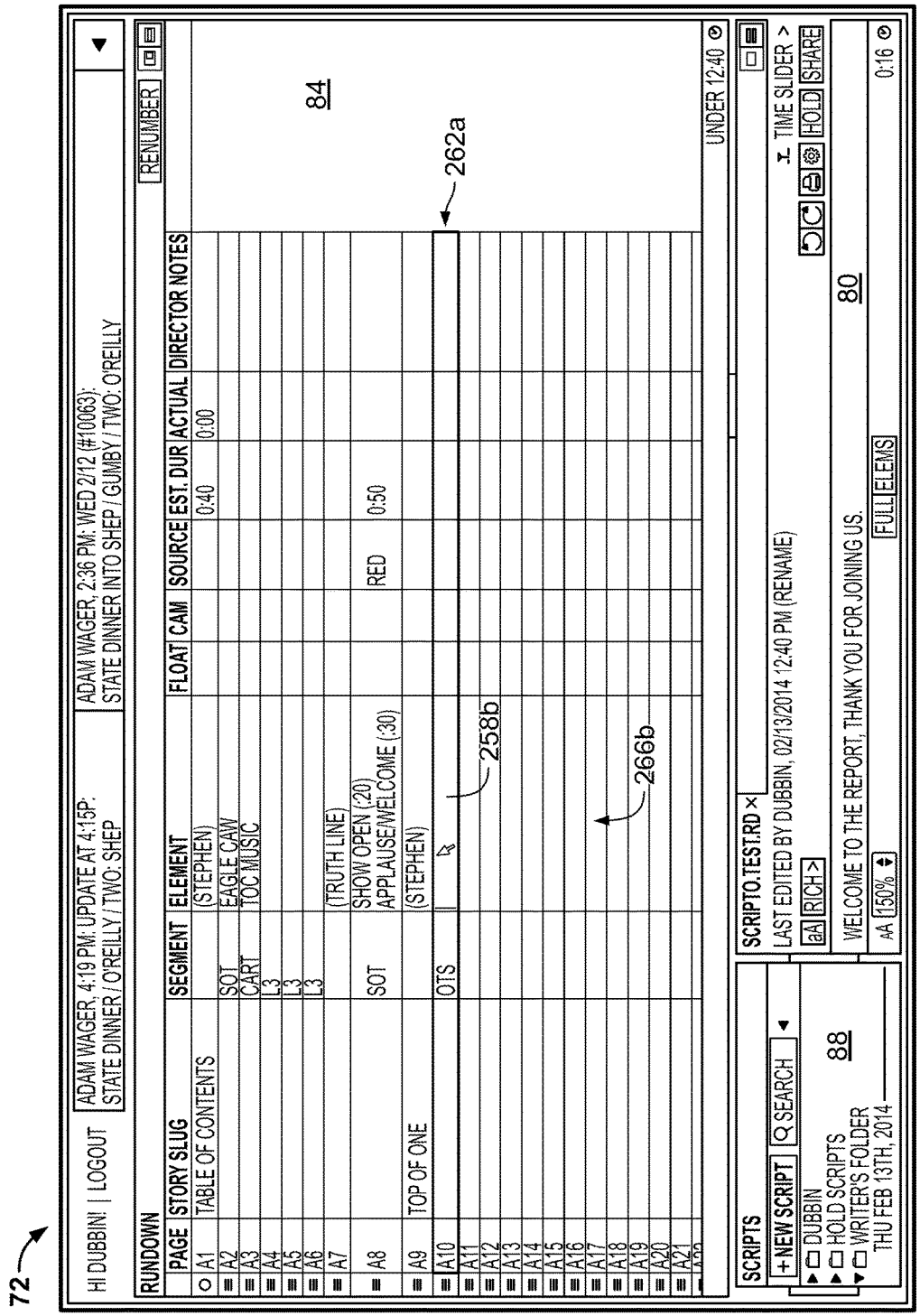
Figure 7D:
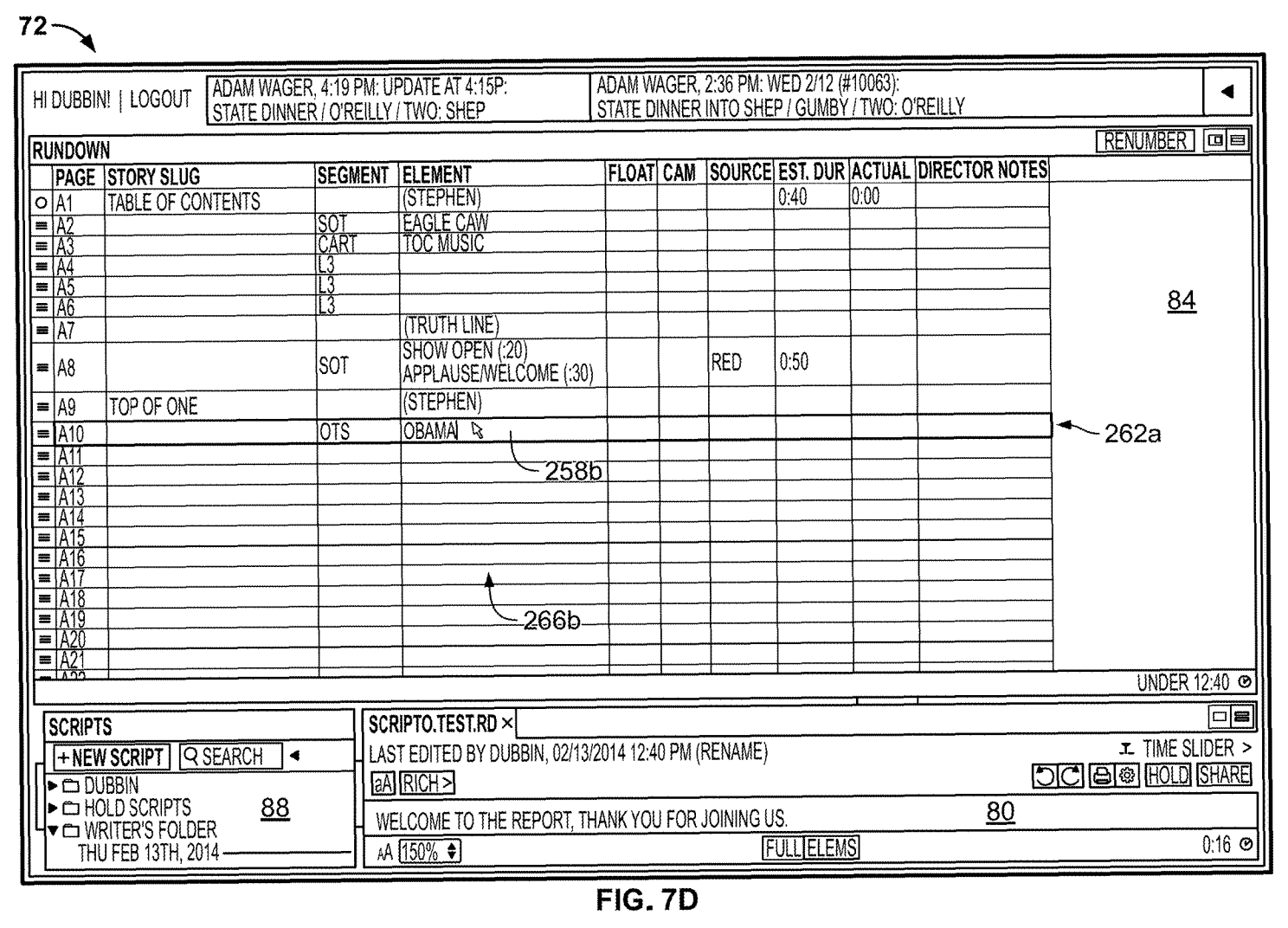
Figure 7E:
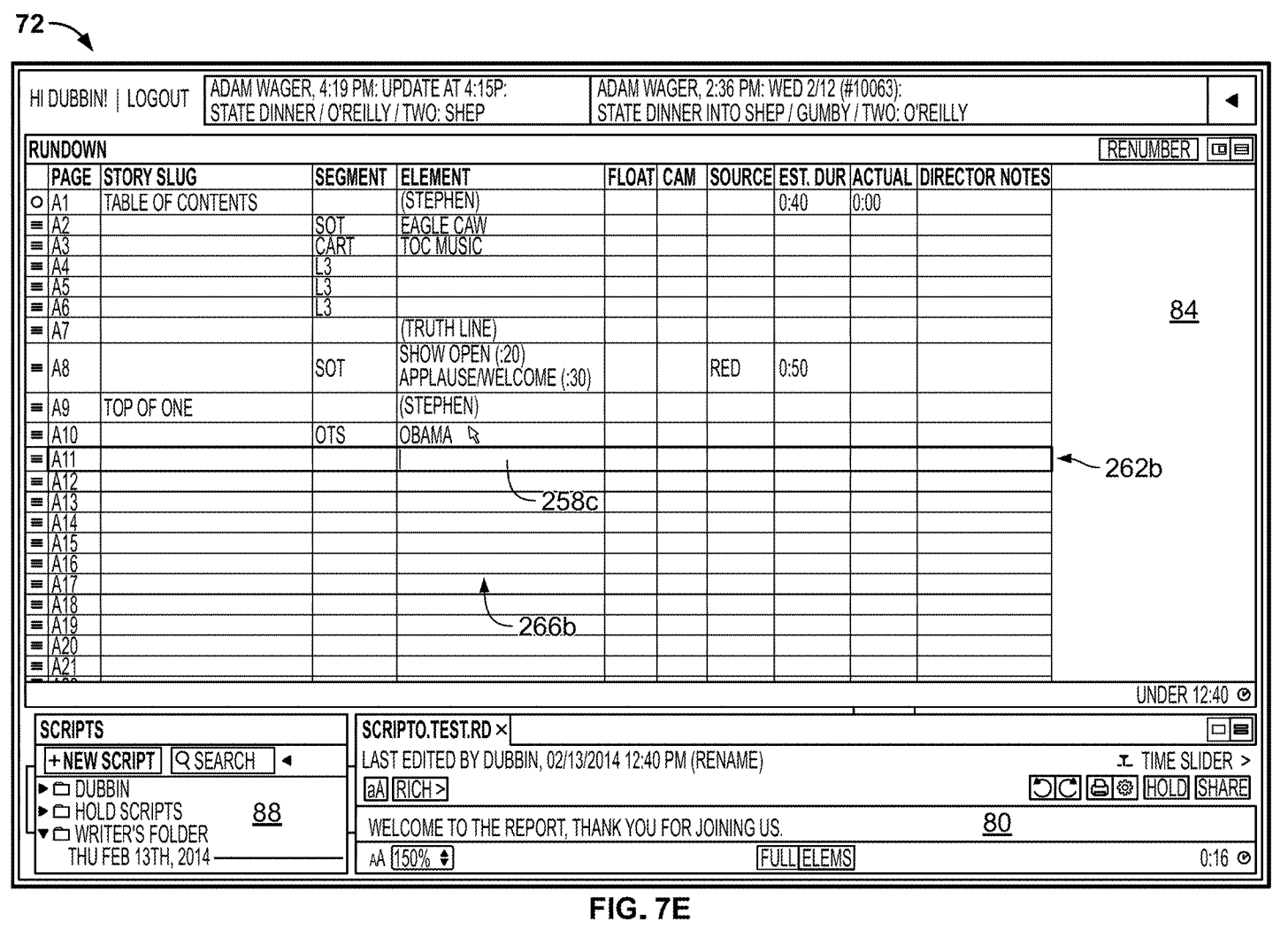

For rundowns, the states of the user interface 72 depicted in FIGS. 7A-7E illustrate an exemplary navigation and editing sequence conducted in the rundown editor 84. In FIG. 7A, the user has navigated to a cell 258a in the "segment" column 266a of a row 262a in the rundown, and the rundown editor 84 has highlighted and placed a cursor in this cell 258a and also highlighted the row 262a containing this cell 258a. In FIG. 7B, the user has edited the contents of the cell 258a to be "ots." In FIG. 7C, the user has navigated to a different cell 258b in the "element" column 266b of the same row 262a in the rundown, and the rundown editor 84 has highlighted and placed a cursor in that cell 258b and kept that same row 262a highlighted. In FIG. 7D, the user has edited the contents of the second cell 258b to be "obama." In FIG. 7E, the user has navigated to another cell 258c in the "element" column 266b of the next row 262a in the rundown, and the rundown editor 84 has highlighted and placed a cursor in that cell 258c and highlighted that row 262b.

If at step 216, it is determined that the script is currently open on at least one other workstation 24 in addition to the first workstation 24, i.e., at least one second workstation 24, the method 210 proceeds along a second branch. At step 222, textual input or cursor movement can be received into the script or rundown in the script or rundown editor 80, 84 on either the first or the at least one second workstations 24. That is, textual input or cursor movement can be received on any workstation 24 on which the script or rundown is currently open. For scripts, step 222 can again be performed in the same manner as in step 116 in the method 110 of FIG. 4. For rundowns, step 222 can be performed as discussed above in connection with FIGS. 7A-7E.

At step 224, the document editor client module 56 and document editor server module 40 can transmit the received textual input or cursor movement, or representations thereof, from the workstation 24 at which it is received to the server 28 and then to all other workstations 24 on which the script or rundown is open.

At step 226, the script or rundown editor 80, 84 can display the received textual input or cursor movement in the script or rundown on both the first and second workstations 24. That is, the received textual input or cursor movement can be displayed on any workstation 24 on which the script or rundown is currently open. For scripts, the textual input can again be displayed as either a dialog element 164 or production element, as the case may be, and therefore step 226 can include the performance of steps 116-130 as depicted in the method 110 of FIG. 4 to properly display the textual input on each workstation 24 in which the script is open, although keeping in mind that this displaying is now occurring on both the first and at least one second workstations 24. For rundowns, step 226 can be performed as discussed above in connection with FIGS. 7A-7E, although again keeping in mind that this displaying is now occurring on both the first and at least one second workstations 24.

The concurrent displaying on all workstations 24 on which a rundown or script is open of changes being made in the script or rundown on any of these workstations 24 can be tailored in its operation for scripts and rundowns respectively. For scripts, in one embodiment, the concurrent displaying may concurrently display textual input but not cursor movement. For rundowns, in one embodiment, the concurrent displaying may concurrently display both textual input and cursor movement.

At step 228, it can be determined whether to continue editing the script or rundown on the first workstation 24, such as in response to the user making such a decision. If at step 228 it is determined to continue editing, the method 210 can return to step 216. If at step 228 it is determined to not continue editing, at step 230 the user script or rundown can be closed in the script or rundown editor 80, 84, such as by the user activating a close script or close rundown control. The script and rundown editors 80, 84 can automatically save any edits to the script or rundown by any user on any workstation 24 in real time during the editing process. The method can end at step 232.

Embodiments of the writing and production system 20 can thus enable improved concurrency of script and rundown editing by multiple different users editing the script or rundown on multiple different workstations 24. The writing and production system 20 can provide real-time concurrency at a level of granularity so as to concurrently show each textual input or cursor movement on other workstations 24 essentially as it is happening on any given workstation 24. The writing and production system 20 therefore vastly improves upon a lock system, in which only one user has privileges to save edits to a script or rundown at one time, as well as other systems.

The writing and production system 20 can also process scripts to suitably prepare them for downstream functions such as delivery to the teleprompter 32 or the printer 36 or conversion to another data format. Such downstream functions can prefer or require as input a file having a format specifically tailored for that downstream function. For example, it may be preferable to deliver to the teleprompter 32 a file including only dialog elements 164 of a script. In some instances it may be preferable to deliver to the printer 36 a file including only dialog elements 164 of a script, but in other instances it may be preferable to deliver to the printer 36 a file including only production elements or including both dialog elements 164 and production elements.

Figure 8:
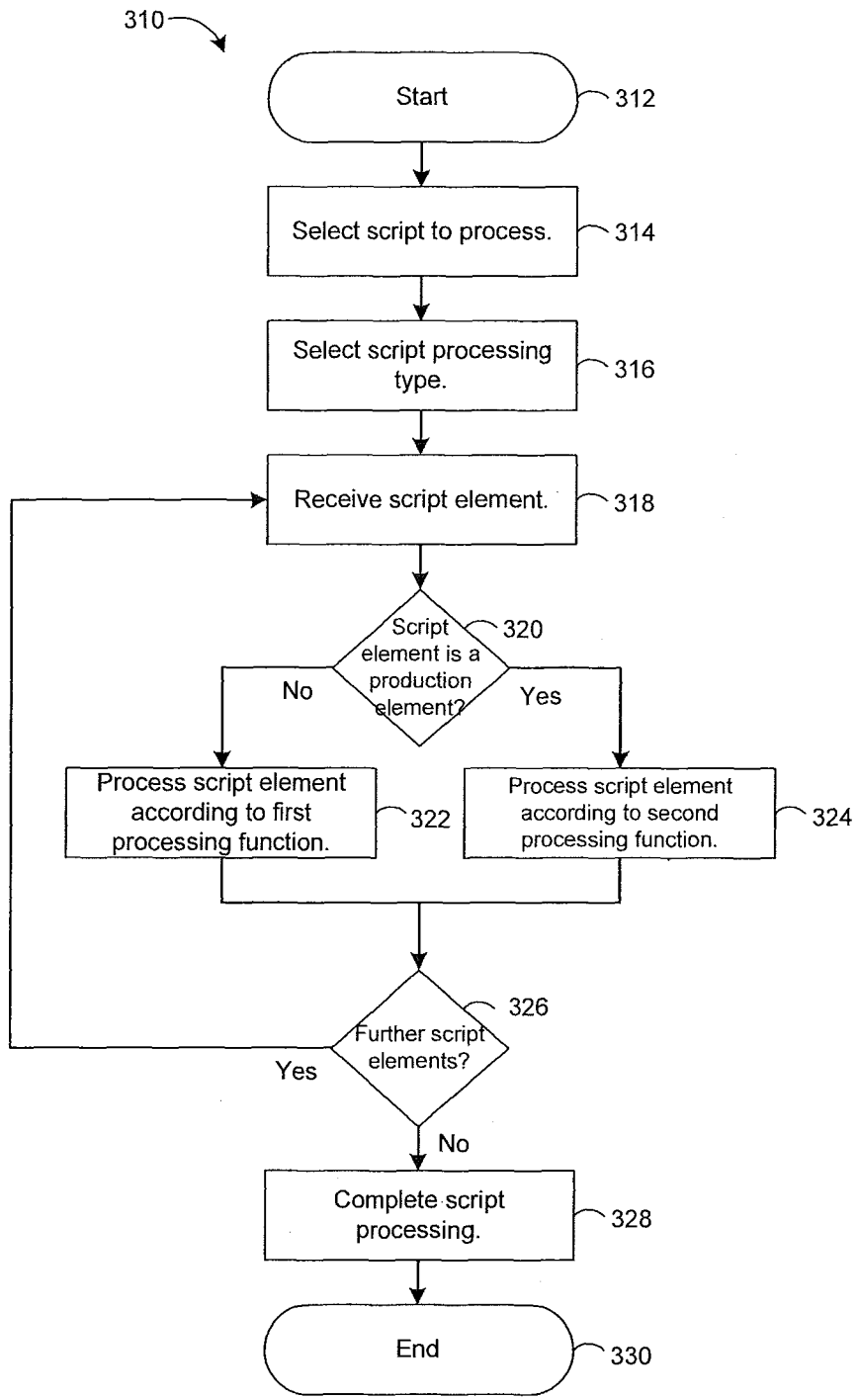
FIG. 8 is a flowchart depicting an embodiment of a method of processing a script.

FIG. 8 is flowchart depicting an embodiment of a method 310 of processing a script or script file using the writing and production system 20. The steps of the method 310 of FIG. 8 can be performed by one or more components of the writing and production system 20, such by one or more of the document editor sever module 40 or the print server module 52.

The method 310 can begin at step 312. At step 314, a script can be selected for processing. The script can be selected in response to an action by the user, for example the user invoking functionality of the writing and production system 20, such as a print or send to teleprompter function, either while the script is open or by using a selection menu of such a functionality. The script can also be selected by an automated functionality, such as by a batch processing functionality. At step 318, the type of script processing to be performed can be selected. The type of script processing can be selected in response to the user invoking the corresponding functionality of the writing and production system, for example by invoking a print or send to teleprompter function.

At step 318, the processing receives an element of the script. This receiving can occur by the writing and production system 20 parsing the selected script. As the script is parsed, each element of the script can be received and processed in turn. At step 320, it can be determined whether the received script element is a production element, for example by determining whether the received script element includes a production element marker such as an opening marker. If at step 320, it is determined that the received script element is not a production element, it is processed according to a first processing function. For example, for processing for teleprompter and some printing tasks, the first processing function may be to leave the received non-production element unaltered. If at step 320, it is determined that the received script element does include a production element, it is processed according to a second processing function. For example, for processing for teleprompter and some printing tasks, the second processing may be to identify and delete the complete production element.

At step 326, it is determined if there are further script elements in the script. If at step 326, there are further script elements in the script, the method 310 can return to step 318. If at step 320, there are no further script elements in the script, the method 310 can proceed to step 328, where the processing is completed. The method 310 can end at step 330.

The method 310 can be performed in a largely automated manner by components of the writing and production system 20. For example, in one embodiment, steps 318-328 of the method 310 can be performed entirely automatically by the writing and production system 20 upon receiving input from a user regarding the selection of a script and a script processing type.

The document manager 88 can provide the user with the ability to navigate and operate upon a file structure of the scripts and rundowns. Scripts and rundowns can be saved as files in the database 44 and accessed by other components of the writing and production system 20. The file structure listing 158 of the document manager 88 can provide a plurality of folders in which scripts and rundowns can be located and accessed. For example, returning to FIG. 5B, in the depicted embodiment the document manager 88 can provide four different folders, including a private folder 160, a Hold Scripts folder 161, a Writer's Folder 162, and a Rundowns folder 163. Each of the provided folders can impart corresponding access and editing privileges to scripts and rundowns contained inside. For example, the private folder 160 can provide access to scripts and rundowns stored in this folder only to a user to whom the private folder is assigned. By contrast, the Hold Scripts folder 161, Writer's folder 162, and Rundowns folder 163 can provide selectable varying levels of access to various users. For example, the Hold Scripts folder 161 can contain scripts for use a specific television show taping, the Writer's folder 161 can contain scripts that are in the process of being written but which have not yet been designated for a specific show taping, and the Rundowns folder 163 can contain rundowns. To share a script in the private folder 160, the user can select a Hold control 106 in the script editor 80 to create an instance of the script open in the script editor 80 in the Hold Scripts folder 161, or select a Share control 108 in the script editor 80 to create an instance of the script open in the script editor 80 in the Writer's folder 161.

The document manager 88 can also provide the user with a graphical indication of the relationship between scripts and rundowns in the file structure. For example, the document manager 88 can provide a first graphical indication, such as displaying a first type of highlighting or a first type of icon, in association with each rundown in the file structure listing 158; a second graphical indication, such as displaying a second type of highlighting or a second type of icon (for example, icon 101 depicted in FIG. 3B), in association with each script displayed in the file structure listing 158 that is not referenced in a rundown in the file structure listing 158; and a third graphical indication, such as displaying a third type of highlighting or a third type of icon (for example, icon 103 depicted in FIG. 3B), in association with each script displayed in the file structure listing 158 that is referenced in a rundown in the file structure listing 158.

The document manager 88 can also include an interface 165 to a search engine to provide the user with the ability to search for existing scripts and rundowns that match a textual input entered into a search field 162. The document manager 88 can provide a first form of the search engine interface 165, for example as depicted in FIG. 5B, that includes a single data entry field 166 for entering textual input. Upon entering textual input in the data entry field 166, the search engine can provide a list of all scripts and rundowns having the entered textual input in any portion of the script or rundown as a list of files in the file structure listing 158 that can be selected and accessed by the user.

Figure 9:
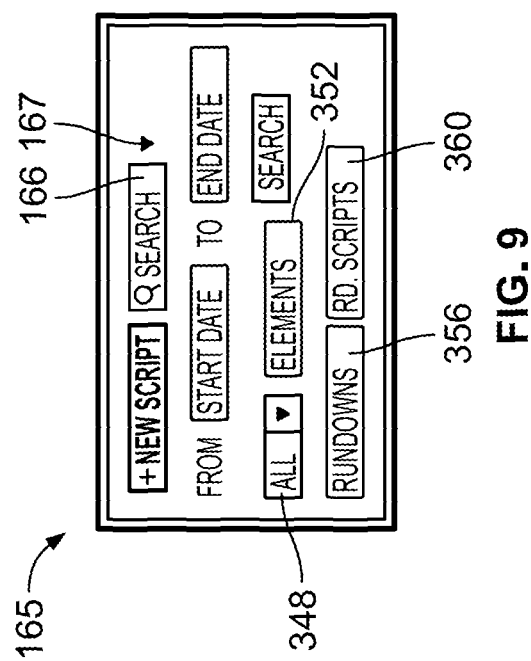
FIG. 9 is a screenshot depicting an embodiment of a search engine interface of the writing and production system.

The document manager 88 can provide a second expanded form of the search engine interface 165 that can be accessed by activating a dropdown control 167 of the search engine interface 165. FIG. 9 depicts an embodiment of the second, expanded form of the search engine interface 165. The expanded form of the search engine interface 165 can include a plurality of additional data entry fields, such as a production element selector 348, a production element data entry field 352, a rundown data entry field 356 and a rundown script data entry field 360.

The expanded search engine interface 165 can provide an interface to search in only production elements or certain types of production elements in scripts. To enable such a search, the element selector 348 can receive a selection from a user of all production elements or a specified subset of production elements for searching, such as by receiving a selection from among a list of production element descriptor acronyms provided by the element selector 348. Upon entering textual input in the production element data entry field 352, the search engine can then provide a list of all scripts having the entered textual input in the identified any production element or subset of production elements as a list of files in the file structure listing 158 that can be selected and accessed by the user. The expanded search engine interface 165 can also provide an interface to search in only rundowns. Upon entering textual input in the rundown data entry field 356, the search engine can provide a list of all rundowns having the entered textual input in any portion of the rundown as a list of files in the file structure listing 158 that can be selected and accessed by the user. The expanded search engine interface 165 can also provide an interface to search in only scripts referenced by rundowns. Upon entering textual input in the rundown script data entry field 360, the search engine can provide a list of all scripts referenced by rundowns having the entered textual input in any portion of the script as a list of files in the file structure listing 158 that can be selected and accessed by the user.

The notification bar 92 can provide an instant message console to facilitate collaboration among users of the writing and production system 20.

One of more of the software modules of the writing and production system 20 can optionally be implemented at least in part by utilizing software technologies such as one or more of Etherpad Lite, UeberDB, Elasticsearch, PDFKit, Docker, JavaScript, CoffeeScript or Toffeescript.

Additional embodiments of the writing and production system 20 and associated methods of operation are possible. For example, any feature of any of the embodiments of the writing and production system and 20 methods of operation described herein can optionally be used in any other embodiment of the writing and production system 20 and methods of operation. Also, embodiments of the writing and production system 20 and methods of operation can optionally include any subset or ordering of the components or features of the writing and production system 20 and method of operation described herein.

What is claimed is:

1. A method of editing a script or rundown, the method comprising:
   a) displaying the script or rundown in a script or rundown editor on a display of a first computing device;
   b) receiving at the first computing device textual input or cursor movement transmitted from a second computing device in response to being received at the second computing device;
   c) determining whether the received textual input includes a predetermined marker;

d) displaying the received textual input or cursor movement in the script or rundown in the script or rundown editor on the display of the first computing device; wherein the textual input is displayed as a dialog element on the display of the first computing device using first text properties based on the determination that the textual input does not include the predetermined marker;

e) after step d), receiving at the first computing device further textual input or cursor movement transmitted from the second computing device in response to being received at the second computing device;

f) determining whether the received further textual input includes a predetermined opening marker or a predetermined closing marker;

g) displaying the received further textual input or cursor movement in the script or rundown in the script or rundown editor on the display of the first computing device as an incomplete production element using second text properties, different from said first text properties, based on the determination that the further textual input includes the predetermined opening marker; and h) displaying the received further textual input or cursor movement in the script or rundown in the script or rundown editor on the display of the first computing device as a complete production element using third text properties, different from said first and second text properties, based on the determination that the further textual input includes the predetermined closing marker.

2. The method of claim 1, wherein the predetermined marker includes one or more textual characters.

3. The method of claim 1, wherein the text properties include at least one of a font, size or color.

4. The method of claim 1, wherein each character of the textual input or each movement of the cursor movement is transmitted from the second computing device to the first computing device in response to being received at the second computing device.

5. The method of claim 1, wherein the textual input or cursor movement is transmitted from the second computing device to the first computing device through a server computing device.

6. The method of claim 1, wherein the script or rundown is a script, and the textual input but not the cursor movement is transmitted from the second computing device to the first computing device and displayed on the first computing device.

7. The method of claim 1, wherein the script or rundown is a rundown, and both the textual input and the cursor movement is transmitted from the second computing device to the first computing device and displayed on the first computing device.

8. The method of claim 7, wherein the rundown is displayed as a two-dimensional array of cells in the rundown editor on the first computing device, and the cursor movement includes a movement of a displayed cursor from a first cell to a second cell in the two-dimensional array of cells.

9. The method of claim 8, wherein the cursor movement includes a changing of a cell and row highlighting.

10. A non-transitory machine-readable medium including program instructions, which when executed by a processor perform a method of editing a script or rundown, the method comprising:

a) displaying the script or rundown in a script or rundown editor on a display of a first computing device;

b) receiving at the first computing device textual input or cursor movement transmitted from a second computing device in response to being received at the second computing device;

c) determining whether the received textual input includes a predetermined marker;

d) displaying the received textual input or cursor movement in the script or rundown in the script or rundown editor on the display of the first computing device; wherein the textual input is displayed as a dialog element on the display of the first computing device using first text properties based on the determination that the textual input does not include the predetermined marker;

e) after step d), receiving at the first computing device further textual input or cursor movement transmitted from the second computing device in response to being received at the second computing device;

f) determining whether the received further textual input includes a predetermined opening marker or a predetermined closing marker;

g) displaying the received further textual input or cursor movement in the script or rundown in the script or rundown editor on the display of the first computing device as an incomplete production element using second text properties, different from said first text properties, based on the determination that the further textual input includes the predetermined opening marker; and h) displaying the received further textual input or cursor movement in the script or rundown in the script or rundown editor on the display of the first computing device as a complete production element using third text properties, different from said first and second text properties, based on the determination that the further textual input includes the predetermined closing marker.

11. The non-transitory machine-readable medium of claim 10, wherein the predetermined marker includes one or more textual characters.

12. The non-transitory machine-readable medium of claim 10, wherein the text properties include at least one of a font, size or color.

13. The non-transitory machine-readable medium of claim 10, wherein the script or rundown is a script, and the textual input but not the cursor movement is transmitted from the second computing device to the first computing device and displayed on the first computing device.

14. The non-transitory machine-readable medium of claim 10, wherein the script or rundown is a rundown, and both the textual input and the cursor movement is transmitted from the second computing device to the first computing device and displayed on the first computing device.

15. The non-transitory machine-readable medium of claim 14, wherein the rundown is displayed as a two-dimensional array of cells in the rundown editor on the first computing device, and the cursor movement includes a movement of a displayed cursor from a first cell to a second cell in the two-dimensional array of cells.

16. A system for editing a script or rundown, the system comprising:

a first computing device including a memory and a processor, the memory including program instructions that when executed by the processor perform a method, the method including:

a) displaying the script or rundown in a script or rundown editor on a display of the first computing device;

b) receiving at the first computing device textual input or cursor movement transmitted from a second computing device in response to being received at the second computing device;

c) determining whether the received textual input includes a predetermined marker;

d) displaying the received textual input or cursor movement in the script or rundown in the script or rundown editor on the display of the first computing device; wherein the textual input is displayed as a dialog element on the display of the first computing device using first text properties based on the determination that the textual input does not include the predetermined marker;

e) after step d), receiving at the first computing device further textual input or cursor movement transmitted from the second computing device in response to being received at the second computing device;

f) determining whether the received further textual input includes a predetermined opening marker or a predetermined closing marker;

g) displaying the received further textual input or cursor movement in the script or rundown in the script or rundown editor on the display of the first computing device as an incomplete production element using second text properties, different from said first text properties, based on the determination that the further textual input includes the predetermined opening marker; and h) displaying the received further textual input or cursor movement in the script or rundown in the script or rundown editor on the display of the first computing device as a complete production element using third text properties, different from said first and second text properties, based on the determination that the further textual input includes the predetermined closing marker.

17. The system of claim 16, wherein the predetermined marker includes one or more textual characters.

18. The system of claim 16, wherein the text properties include at least one of a font, size or color.

* * * * *